April 9, 1968 — V. R. UDE — 3,377,081
HAND TRUCK
Filed Feb. 7, 1966
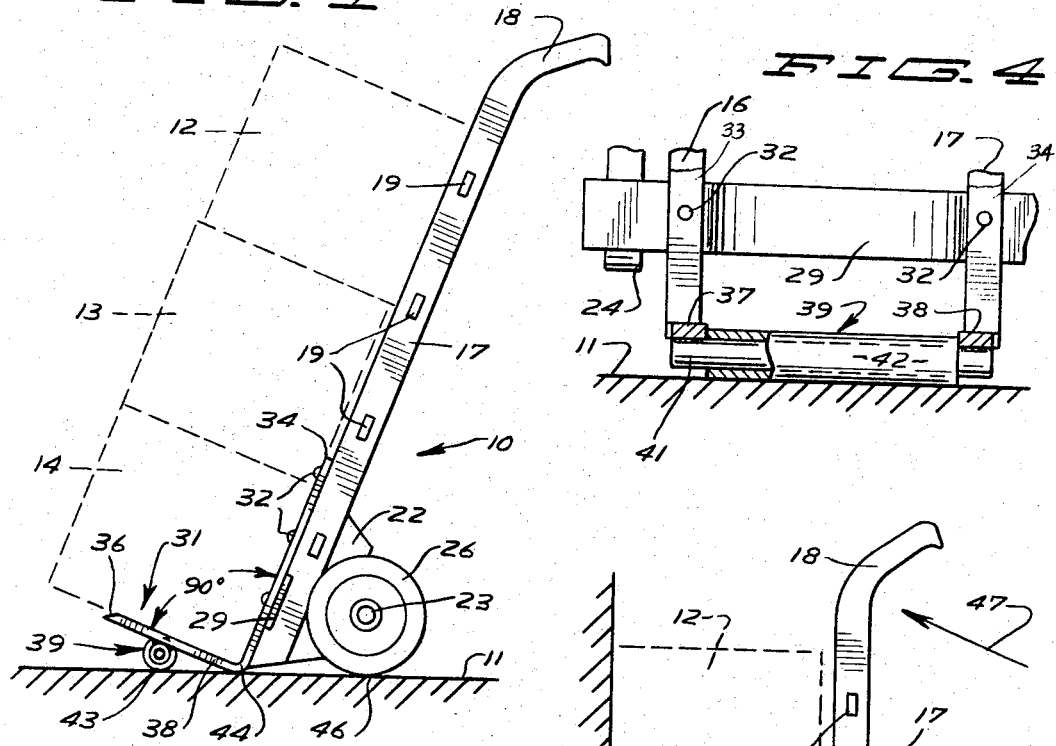
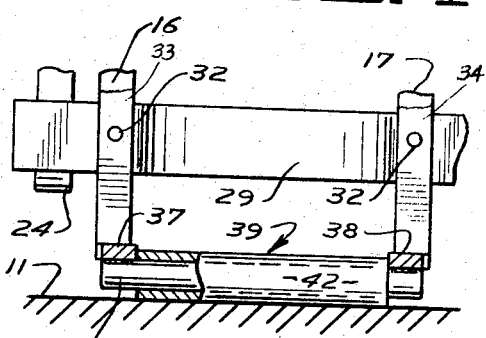
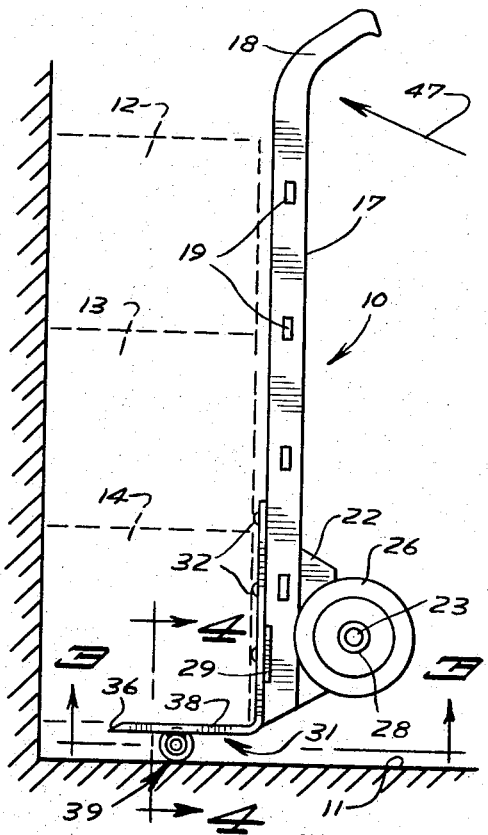
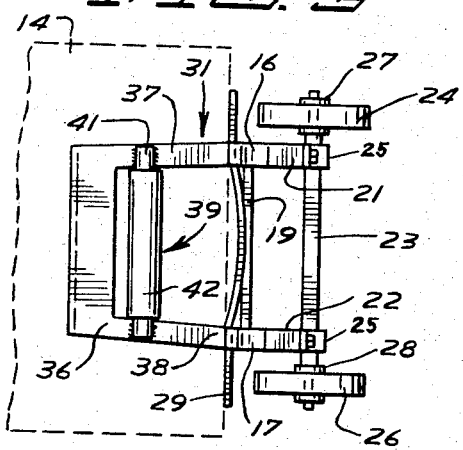
INVENTOR.
VERNON R. UDE
BY Braddock & Burd
ATTORNEYS

United States Patent Office 3,377,081
Patented Apr. 9, 1968

3,377,081
HAND TRUCK
Vernon R. Ude, Box 157, Harlem, Mont. 59526
Filed Feb. 7, 1966, Ser. No. 525,419
9 Claims. (Cl. 280—47.27)

ABSTRACT OF THE DISCLOSURE

A two wheeled hand truck having a forwardly projected nose carrying an elongated transverse roller. The nose has a substantially flat platform used to hold freight articles in a tightly controlled location on the front side of an upwardly directed frame. When the hand truck is in the loading position the elongated roller and the wheels engage the supporting surface with the center of gravity of the load on the truck located along a vertical line which passes between the axis of rotation of the wheels and the axis of rotation of the roller.

Summary of invention

This invention relates to a wheeled vehicle for carrying articles. More particularly the vehicle of this invention is a two wheeled hand truck usable to carry freight articles with a minimum of effort.

Briefly stated, the hand truck of this invention has an elongated frame having a lower end section secured to a pair of main wheels. A fork attached to the lower part of the frame has a forwardly projected nose which functions as a platform to hold freight articles in a tightly controlled location on the front side of the frame. This is achieved by locating the nose substantially normal to the longitudinal plane of the frame.

Elbow means are used to attach the nose to upright portions of the fork secured to the frame. When the truck is in loading position the frame projects upwardly with the elbow means in engagement with the support surface thereby preventing movement of the truck. Positioned below and transversely of the nose is a roller assembly having an elongated sleeve which acts as a fulcrum and carries the load weight during the unloading of the truck. When the truck is in the loading position the sleeve, the elbow means and the wheels all engage the support surface stabilizing the frame against lateral movement as well as angular movement. The angular position of the frame positions the center of gravity of the load on the truck in the loading position just forwardly of the main wheels. Under these conditions only a minimum amount of force is necessary to move the truck from the loading position to the moving position.

All the freight are unloaded from the truck together by pivoting the frame in a forward direction first about the axes of the main wheels and subsequently about the axis of the roller assembly, As the frame is pivoted the center of gravity of the freight articles moves forwardly over the roller assembly causing the freight articles to slide from the nose. The weight of the freight articles forces the nose in a rearwardly direction freeing the cart from the freight articles.

In the drawing:

FIGURE 1 is a side elevational view of the hand truck of the invention shown in the loading position carrying a plurality of freight articles;

FIGURE 2 is a side elevational view of the hand truck of FIGURE 1 showing the position of the truck unloading the articles carried on the truck;

FIGURE 3 is a sectional view taken along the line 3—3 of FIGURE 2; and

FIGURE 4 is an enlarged sectional view taken along the line 4—4 of FIGURE 2.

Referring to the drawing there is shown in FIGURE 1, the hand truck of this invention indicated generally at 10 located on a support 11, as a floor or platform. Truck 10 is shown in a rest position carrying a cargo of freight articles 12, 13, and 14, as boxes, bagged grain, feed and fertilizer, or baled hay and straw and the like.

Hand truck 10 is a two wheeled vehicle having a pair of upright side rails or beams 16 and 17 laterally spaced from each other and extend substantially parallel to each other. Each beam terminates at its upper end with rearwardly curved handles 18 providing convenient hand grip members. A plurality of transverse brace members 19 extend between rails 16 and 17. Opposite ends of members 19 are secured to rails 16 and 17 forming the frame of the truck. The frame is of a general rectangular shape having a lower portion adjacent support surface 11 and an upper portion including handles 18.

Secured to the rear side of the lower portions of each rail 16 and 17 are blocks 21 and 22 supporting a transverse square axle 23. A pair of U-shaped clamps 25 secure axle 23 to the bottom sides of blocks 21 and 22. Wheels 24 and 26 are rotatably mounted on sleeves 27 and 28 telescoped onto the opposite ends of axle 23. Suitable fastening means, as pins, bolts, cotter keys, and the like, hold the sleeves on the ends of the axle. A plate 29 extends transversely across the forward side of the rails 16 and 17 opposite the axle 23. Midsection of plate 29 is curved toward the axle 23 and the end sections of plate 29 project laterally from the rails 16 and 17 over wheels 24 and 26.

A one piece right angle fork indicated generally at 31 is secured with a plurality of bolt and nut assemblies 32 to the lower portions of side rails 16 and 17. Fork 31 is a one piece metal member having a pair of spaced upwardly projected legs 33 and 34 integral with a forwardly projected U-shaped nose section. Elbow sections 44 connect legs 33 and 34 to the nose section. As shown in FIGURE 3, the nose section has a transverse forward flat base 36, and flat side members 37 and 38 joined to the lower ends of legs 33 and 34 at elbow sections 44. The angle between legs 33 and 34 and sides 37 and 38 is substantially 90 degrees. As shown in FIGURE 3, sides 37 and 38 converge in a forward direction toward base 36.

Mounted on the lower sides of side members 37 and 38 rearwardly of the base 36 is a transverse roller assembly indicated generally at 39. As shown in FIGURE 4, roller assembly 39 comprises a cylindrical axle 41 having opposite ends secured to the bottom surfaces of side members 37 and 38 by welds or the like. A tubular roller or sleeve 42 telescoped over axle 41 is located between side members 37 and 38. Sleeve 42 has an inside diameter which permits rotation of the sleeve on axle 41. Opposite ends of sleeve 42 are located in close clearance relation with respect to the inside surfaces of side members 37 and 38 to limit lateral movement of sleeve 42 and yet permit free rotation of sleeve 42 on axle 41. Sleeve 42 has an outside diameter which is approximately ¼ the diameter of wheels 24 and 26. As shown in FIGURE 4, the entire peripheral surface of sleeve 42 is located below the common plane of the top surfaces of the side members 37 and 38 whereby the bottom freight article 14 does not inhibit rotation of sleeve 42.

Referring to FIGURE 1, hand truck 10 is shown in the rest or loading position. In this position roller assembly 39 contacts support surface 11 as indicated at numeral 43 along the entire length of sleeve 42. At the same time both elbows 44 of fork 31 contact the support surface 11 and function as friction brake members preventing movement of the truck. In addition wheels 24 and 26 engage the support surface 11 at points 46 rearwardly and outwardly from elbows 44 laterally stabilizing the truck. In the loading position the frame of truck 10 does not angularly move because the center of gravity of the entire weight load articles 12, 13 and 14, is located along a line which passes between the axis of rotation of wheels 24 and 26 and the axis of rotation of sleeve 42. The load holds elbows 44 in engagement with support surface 11. The nose section of fork 31 projected at right angles from the rails 16 and 17 causes the freight articles 12, 13 and 14 to be securely held in place while truck 10 is at rest and during the movement of the truck to its new location. In the rest position the rails 16 and 17 project upwardly about an angle of between 65 to 75 degrees with respect to the horizontal. Sleeve 42 holds nose section of fork 31 in an upwardly and forwardly projected direction while the freight articles are being loaded on the truck. Nose section project upwardly at an angle of 15 to 25 degrees with respect to the horizontal.

Truck 10 is moved to a new location by pulling hand rails 16 and 17 in a rearward direction to support the entire load on main wheels 24 and 26. After truck 10 has been moved or rolled to a new location freight articles 12, 13 and 14 are unloaded from the truck by moving rails 16 and 17 in a forward direction as indicated by arrow 47 in FIGURE 2 to place the freight articles adjacent an upright wall 48. As the truck rails are pushed forward the truck frame first assumes the loading position of FIGURE 1 wherein roller assembly 39 is in line contact with the support surface 11, elbows 44 engage the support surface and wheels 24 and 26 engage the support surface 11. Further forward movement of side rails 16 and 17 transfers the entire load to the roller assembly 39 which acts as a fulcrum allowing the center of gravity of the freight articles to shift forwardly of the axis of rotation of sleeve 42. As shown in FIGURE 4, at this point the freight articles move against wall 48, and the main wheels 24 and 26 and elbow sections 44 are elevated above supporting surface 11. If necessary the truck and freight articles can be moved as sleeve 42 is rotatably mounted on axle 41. As the top article 12 engages wall 48 the pressure on the handles 18 of the side rails causes all the freight articles to move against the wall in a vertical position. At the same time a rearward force is exerted on the nose section of fork 31 causing the nose section to move out from under the lower freight article 14. In this manner freight articles are stacked in a tight vertical position with very little effort on the part of the operator of the truck.

The specific embodiment of the hand truck described is given by way of example. The invention is to be limited only by the terms and scope of the following claims.

The embodiments of the invention in which an exclusive property or privilege is claimed are defined as follows:

1. A hand truck for transporting articles comprising an elongated frame having an upper section and a lower section, wheel means for supporting the frame on a surface, means mounting the wheel means on said lower section for rotation about a first horizontal axis extended transversely of the frame; a fork having a first portion secured to the lower section of the frame, a forwardly projected nose portion for supporting said articles and holding the articles on the frame, and elbow means connecting said first portion with said nose portion; and transversely extended roller means secured to said forwardly projected nose portion of the fork for rotation about a second horizontal axis, said second axis located forwardly of and extended substantially parallel to said first axis, said roller means located below the plane of the upper side of the nose portion, said wheel means, elbow means and roller means located along substantially the same horizontal plane of a supporting surface when the truck is in a rest position to stabilize the frame against lateral movement as well as angular movement, said wheel means and roller means when in engagement with the supporting surface positioning the frame in a stationary loading position wherein the frame extends in an upwardly and rearwardly direction so that the center of gravity of the entire load on the truck, when in the loading position, is along a vertical line which passes between the axis of rotation of the wheel means and the axis of rotation of the roller means.

2. The hand truck defined in claim 1 wherein said wheel means includes a pair of wheels located laterally outwardly from said frame, said elbow means comprising a pair of transversely spaced right angle sections securing the nose portion to the first portion of the fork, and said roller means having an elongated rotatable member engageable in transverse line contact with the support surface.

3. The hand truck defined in claim 1 wherein said nose portion has a generally U-shape and projects forwardly generally normal to said first portion, and said roller means having a rotatable sleeve located between the sides of U-shaped second portion and below the plane of the upper surface of the second portion.

4. The hand truck defined in claim 1 wherein the angle between said nose portion and said frame is substantially 90 degrees.

5. The hand truck defined in claim 1 wherein said nose portion has a U-shaped outline formed by a forward transverse base and rearwardly projected opposite side members integral with the base and secured to the elbow means, said nose portion projected substantially normal to said frame, and said roller means having a cylindrical axle secured to the lower sides of the side members adjacent and generally parallel to said base and a sleeve telescoped over said axle, said sleeve having opposite ends located in close clearance relation with respect to the inside surfaces of said side members, the entire peripheral surface of said sleeve being located below the common plane of the top surfaces of the side members.

6. The hand truck defined in claim 1 wherein the center of gravity of the load on the truck when in the loading position is along a vertical line forwardly of the wheel means and rearwardly of the elbow means.

7. The hand truck defined in claim 1 wherein said nose portion is wider than said roller means.

8. The hand truck defined in claim 1 wherein said nose portion has a flat upper surface and a width wider than said roller means.

9. The hand truck defined in claim 1 wherein said fork is a one piece angle member.

References Cited

UNITED STATES PATENTS

| 1,542,327 | 6/1925 | Slingsby | 280—47.27 X |
| 3,112,042 | 11/1963 | Leshner | 280—47.2 X |

FOREIGN PATENTS

| 251,942 | 5/1964 | Australia. |
| 626,692 | 9/1961 | Canada. |

BENJAMIN HERSH, *Primary Examiner.*

J. A. PEKAR, *Assistant Examiner.*